(12) United States Patent
Anklesaria et al.

(10) Patent No.: US 12,490,078 B2
(45) Date of Patent: Dec. 2, 2025

(54) SYSTEM AND METHOD FOR RESTORING AN eSIM PROFILE

(71) Applicant: VERIZON PATENT AND LICENSING INC., Basking Ridge, NJ (US)

(72) Inventors: Hitesh A. Anklesaria, Monroe, NJ (US); Praveen Venkataramu, Raritan, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 381 days.

(21) Appl. No.: 18/166,527

(22) Filed: Feb. 9, 2023

(65) Prior Publication Data
US 2024/0276201 A1    Aug. 15, 2024

(51) Int. Cl.
*H04W 8/18* (2009.01)
*H04W 76/19* (2018.01)

(52) U.S. Cl.
CPC ........... *H04W 8/183* (2013.01); *H04W 76/19* (2018.02)

(58) Field of Classification Search
CPC ...... H04W 8/183; H04W 76/19; H04W 8/205
See application file for complete search history.

(56) References Cited

U.S. PATENT DOCUMENTS

| | | | |
|---|---|---|---|
| 11,310,654 B1* | 4/2022 | Indurkar | H04W 8/205 |
| 2021/0120595 A1* | 4/2021 | Singh | H04W 4/48 |
| 2022/0014900 A1* | 1/2022 | Gandhi | H04W 12/40 |
| 2023/0083018 A1* | 3/2023 | Jin | H04W 8/205 |
| | | | 455/418 |

* cited by examiner

*Primary Examiner* — Dhaval V Patel (57) ABSTRACT

The disclosed systems and methods provide a novel framework for eSIM profile management. The disclosed framework provides computerized capabilities related to the automatic reinstallation and reactivation of an eSIM profile. The framework provides functionality for the downloading, and the active selection and deletion of eSIM profiles, and the reinstallation of eSIM profiles on user devices. Accordingly, the framework provides novel capabilities for a device to be provisioned and assigned with an eSIM profile, whether the eSIM profile is a new profile (e.g., a new account for the device) or reinstatement of a previously deleted profile (e.g., via a factory reset, for example, a mobile device management (MDM) wipe). Thus, when an user device's connectivity is severed from a network via deletion of an eSIM profile, the disclosed framework can effectuate the automatic reinitiating and installation of such profile, thereby enabling connectivity for the user device in an automatic manner.

20 Claims, 5 Drawing Sheets

SYSTEM AND METHOD FOR RESTORING AN eSIM PROFILE

BACKGROUND

An embedded security information management (eSIM) card (referred to as an eSIM, interchangeably) is a programmable that is permanently embedded into a device. As compared to a traditional SIM card which is typically an located on a removable universal integrated circuit card (UICC), an eSIM consists of software installed onto an electronic UICC (eUICC) chip permanently attached to a device.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

According to some embodiments, as discussed herein, disclosed is a computerized framework that enables a user's endpoint device (e.g., a user's mobile device or other cellular enabled user equipment (UE), as discussed below) to download and initiate an eSIM profile. In some embodiments, the eSIM profile provides functionality for the endpoint device to connect to a mobile network operator (MNO), as discussed in more detail below.

By way of background, the advent of the eSIM enabled users to have the ability to provision and activate their devices without the need for physical SIMs. For example, the eSIM eliminated the need to remove the SIM tray and insert a physical SIM, as the eSIM was an integrated digital SIM to the motherboard of the user device.

According to some embodiments, the process of connecting to a cellular network can be separated into distinct parts, which can involve provisioning and activation. In some embodiments, a device can be provisioned to an account along with a price plan and relevant features via a front-end system of a cellular carrier (e.g., Verizon®, for example). In some embodiments, as discussed herein, a provisioning process can enable the assignment of a mobile number (e.g., a MDN—mobile device number) and a reservation of an eSIM profile.

Accordingly, in some embodiments, activation can involve downloading the eSIM profile to the device. This can be enabled via a network connection (e.g., WiFi connection to the Internet, for example), where the carrier's discovery servers can provide the eSIM profile for download, as discussed below.

According to some embodiments, a user device can have associated therewith multiple eSIM profiles, whereby distinct MDN numbers can be assigned to the device for each specific profile. For example, a device can have two profiles with two separate phone numbers. Multiple eSIMs can be enabled for a device-supported dual SIM dual standby (DSDS) functionality. In some embodiments, whether a device has the capabilities for enabling multiple eSIM profiles can depend on, but is not limited to, memory available on the device and/or the size of the profiles, and the like.

For purposes of this disclosure, a single eSIM profile will be discussed in relation to the disclosed functionality; however, it will be understood that multiple eSIM profiles can be utilized via the disclosed systems and methods without departing from the scope of the instant disclosure.

As such, according to some embodiments, the disclosed framework provides novel functionality for eSIM profile management. As discussed herein, the framework provides functionality for the downloading, and the active selection and deletion of eSIM profiles, and the reinstallation of such eSIM profiles. In some embodiments, such functionality can be enabled via the user device, from an account webpage or application, and/or from a network resource where a user can access their cellular plan/account information.

Currently, as with conventional mechanisms enabled via eSIMs, when a user device is provisioned for a cellular network (e.g., upon initiation of a new service, or reinstalling a deleted profile), there are currently no capabilities for provisioning and assigning the eSIM profile. That is, in order for an eSIM profile to be enacted (or become active and associated with a user device), the user must contact the cellular carrier and via interaction with a customer service representative, enact their service. Effectively, this involves speaking with the representative and validating the representative's actions by authenticating the user's identity (e.g., answering authentication questions so that the representative can look up the user's account). This approach requires extensive time consumption via interactions with the customer service representative and requires network resource consumption by the MNO, as the MNO must reserve a new eSIM and await a connection for it to be provided to the registered device.

As discussed herein, in some embodiments, the disclosed framework provides novel capabilities for a device to be provisioned and assigned with an eSIM profile. Whether the eSIM profile is a new profile (e.g., a new account for the device) or reinstatement of a previously deleted profile (e.g., via a factory reset, for example, a mobile device management (MDM) wipe), the disclosed framework can enable computerized authentication with the MNO, whereby the proper eSIM profile can be automatically installed on the user device. As discussed in more detail below, the disclosed framework can enable automatic authentication of the user's account, whereby the MNO can effectuate the downloading of the eSIM profile to the user's device. As mentioned above and discussed below, the framework can enable the eSIM profile integration for a user device for a new line of service and/or for a deleted profile which is to be reinstalled.

Figure 1:
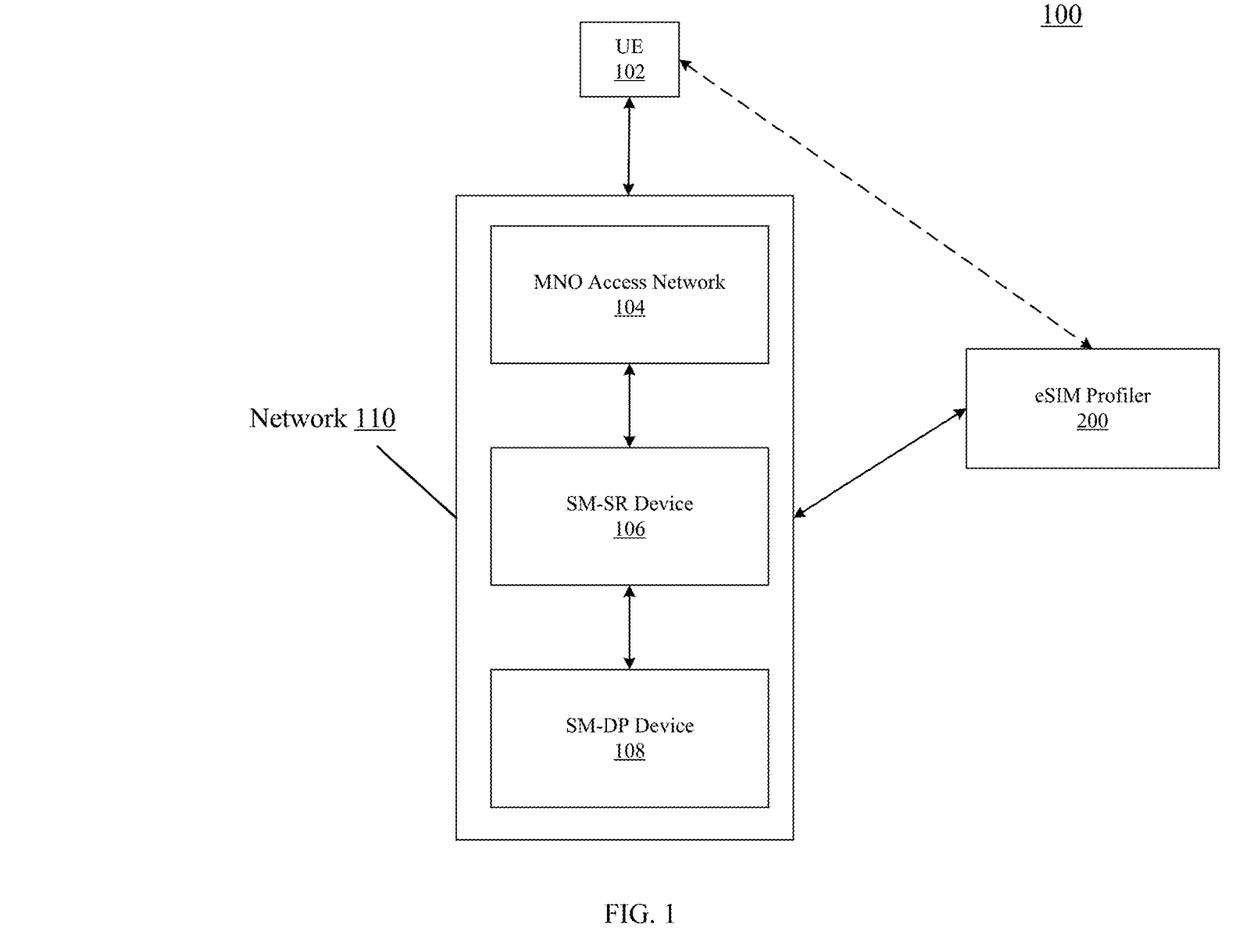
FIG. 1 is a block diagram of an example network architecture according to some embodiments of the present disclosure.

FIG. 1 is a block diagram of an example network architecture according to some embodiments of the present disclosure. In the illustrated embodiment, UE 102 can access a network 110, which includes, but is not limited to, MNO access network 104, subscription management secure routing (SM-SR) device 106 and subscription management discovery (SM-DP) device 108.

In some embodiments, UE 102 can be any type of known or to be known computing device capable of communicating with and/or accessing network 110. As a few non-limiting examples, UE 102 may include, but is not limited to, mobile phones, smartphones, tablets, laptops, sensor, Internet of Things (IoT) devices, autonomous machines, unmanned aerial vehicles (UAVs), wired devices, wireless handsets, and/or any other type of device equipped with cellular or wireless capabilities. A non-limiting example of UE 102 is provided in FIG. 5, discussed infra.

According to some embodiments, UE 102 can access network 110 via MNO access network 104, which authenticates UE 102 devices accessing the network 110. MNO access network 104 can be any type of network component and/or device capable of establishing remote logins to establish a point-to-point protocol connection. For example, a point to point connection, as depicted in FIG. 1, can be between UE 102 and the MNO access network 104.

In some embodiments, SM-SR device 106 can be any type of device or network component capable of managing and/or encrypting operator credentials for an eSIM profile. In some embodiments, SM-SR device 106 can be in communication with the MNO access network 104, and can securely route communication to/from UE 102 to the SM-DP device 108.

In some embodiments, SM-DP device 108 can manage cellular plans or subscriptions of users for a cellular carrier(s). In some embodiments, SM-DP device 108 can be any type of device and/or network component capable of managing eSIM profiles, as discussed below.

In the illustrated embodiment, the network 110 can provide functionality for a cellular access network, for example, a fifth-generation (5G) network or a fourth-generation (4G) network, for example. In some embodiments, the network 110 can include a NextGen Radio Access Network (NG-RAN), which can be communicatively coupled to UE 102. In some embodiments, the network 110 may include a plurality of base stations (e.g., eNodeB (eNB), gNodeB (gNB)) communicatively connected to UE 102 via an air interface. In some embodiments, the air interface comprises a New Radio (NR) air interface. For example, in a 5G network, UE 102 can be communicatively coupled to another UE(s) via an X2 interface.

According to some embodiments, eSIM profiler 200 can be hosted by any type of network device or server, as depicted in FIG. 1, whereby profiler 200 is illustrated as being capable of being associated with UE 102 and/or components of network 110. For example, profiler 200 can be hosted by, but is not limited to, UE 102, an edge node or MEC server, application server, content server, web server, and the like, or some combination thereof.

Figure 2:
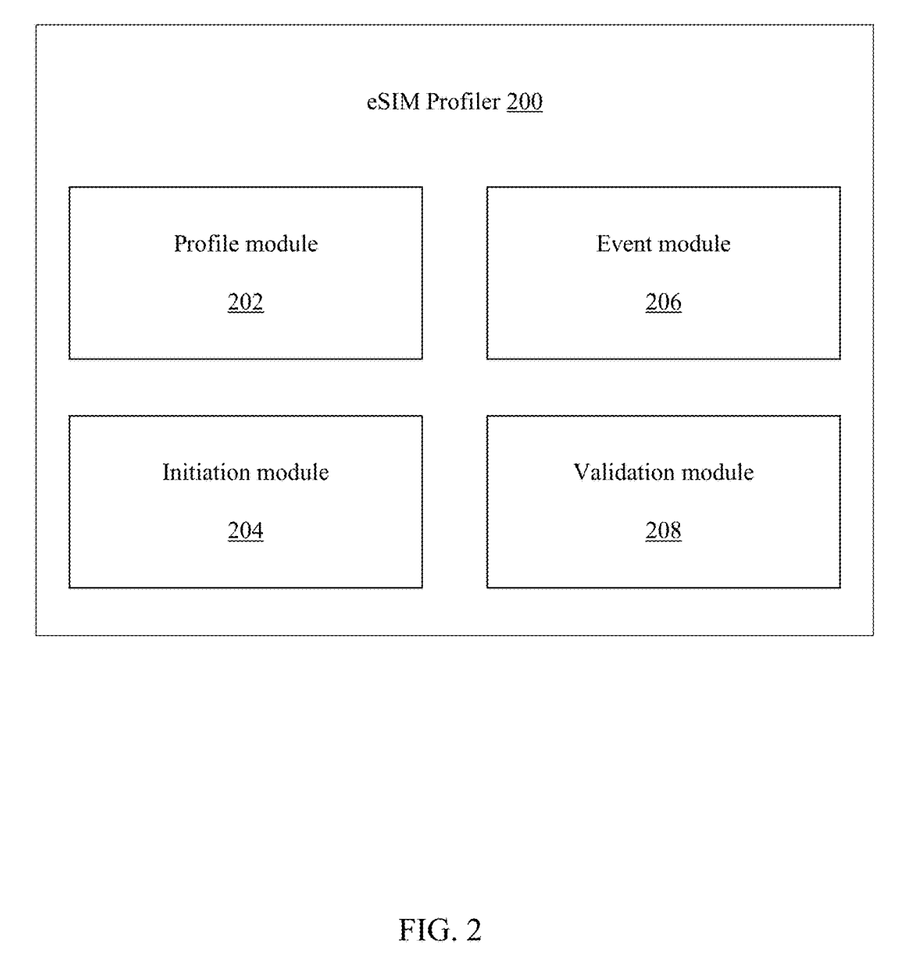
FIG. 2 is a block diagram illustrating components of an example system according to some embodiments of the present disclosure.

As illustrated in FIG. 2, eSIM profiler 200 can include, but is not limited to, profile module 202, initiation module 204, event module 206 and validation module 208. It should be understood that the eSIM profiler 200 and its modules 202-208, as discussed herein, are non-exhaustive, as additional or fewer engines and/or modules (or sub-modules) may be applicable to the embodiments of the systems and methods discussed. More detail of the operations, configurations and functionalities of profiler 200 and each of its modules, and their role within embodiments of the present disclosure will be discussed below in relation to FIGS. 3-4.

Figure 3:
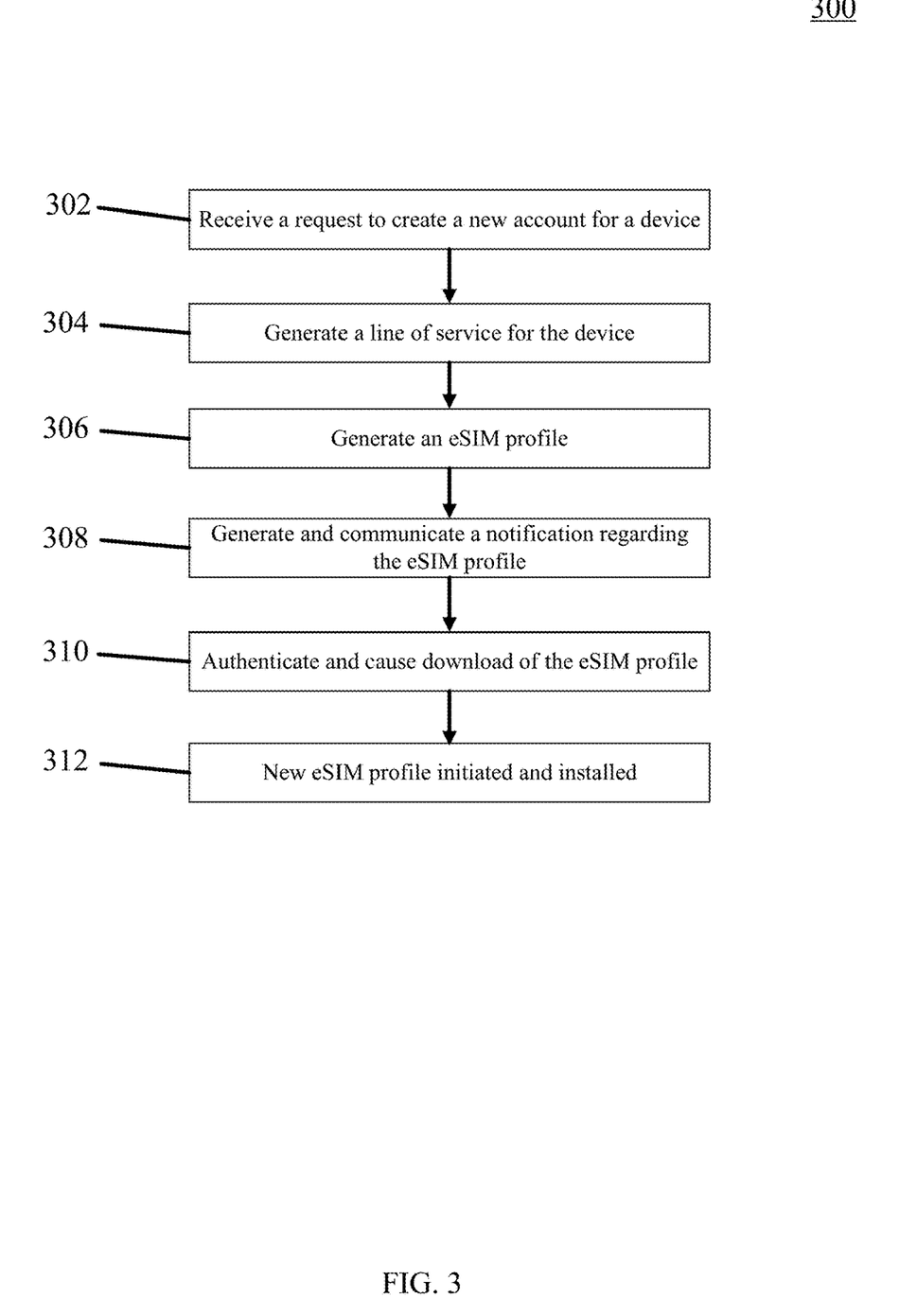
FIG. 3 illustrates an exemplary workflow according to some embodiments of the present disclosure.

FIG. 3 provides Process 300 which details non-limiting example embodiments for the initial provisioning and assignment of an eSIM profile for a user's device (e.g., UE 102). As provided in relation to FIG. 4, discussed below, Process 400 details non-limiting embodiments for reprovisioning and reassigning the eSIM profile to the device after its deletion.

According to some embodiments, Steps 302-306 of Process 300 can be performed by profile module 202 of eSIM profiler 200; and Steps 308-312 can be performed by initiation module 204.

According to some embodiments, Process 300 begins with Step 302 where profiler 200 receives a request to provision a new account for a device of a user (e.g., UE 102). In some embodiments, as discussed above, the user request can be routed through the MNO access network 104 to the SM-SR device 106, then to the SM-DP device 108, as illustrated in FIG. 1. Accordingly, in some embodiments, profiler 200 can create an account for the device (and/or user) on the SM-DP device 108. In some embodiments, the account can correspond to a specific cellular plan, a specific carrier, a line of service, type of device, geographic location, and the like, or some combination thereof. For example, the account can specify a cellular usage rate/amount, data usage threshold/limit, and the like, for which the device can access and communicate over network 110.

In Step 304, a line of service is generated by profiler 200. According to some embodiments, the generation of the line of service for the device can involve identifying and/or generating a mobile number (MDN)) that is to be assigned to the device. According to some embodiments, the line of service can enable basic (or limited) connectivity for UE 102 to access the network 110. As provided below, the limited connectivity can enable the network-based transmission, initiation and installation of the eSIM profile. That is, the connectivity via the line of service can enable data transfer to and from UE 102 (e.g., notifications, text messages) for completing activation of service.

In Step 306, profiler 200 can generate a new eSIM profile. In some embodiments, the generated eSIM profile corresponds to a provisioned account for the device as requested in Step 302. The generated eSIM includes (e.g., is assigned) the mobile number generated in Step 304. According to some embodiments, the eSIM profile can be configured as a downloadable file that is to be installed within the device (e.g., UE 102), as discussed below.

Figure 4:
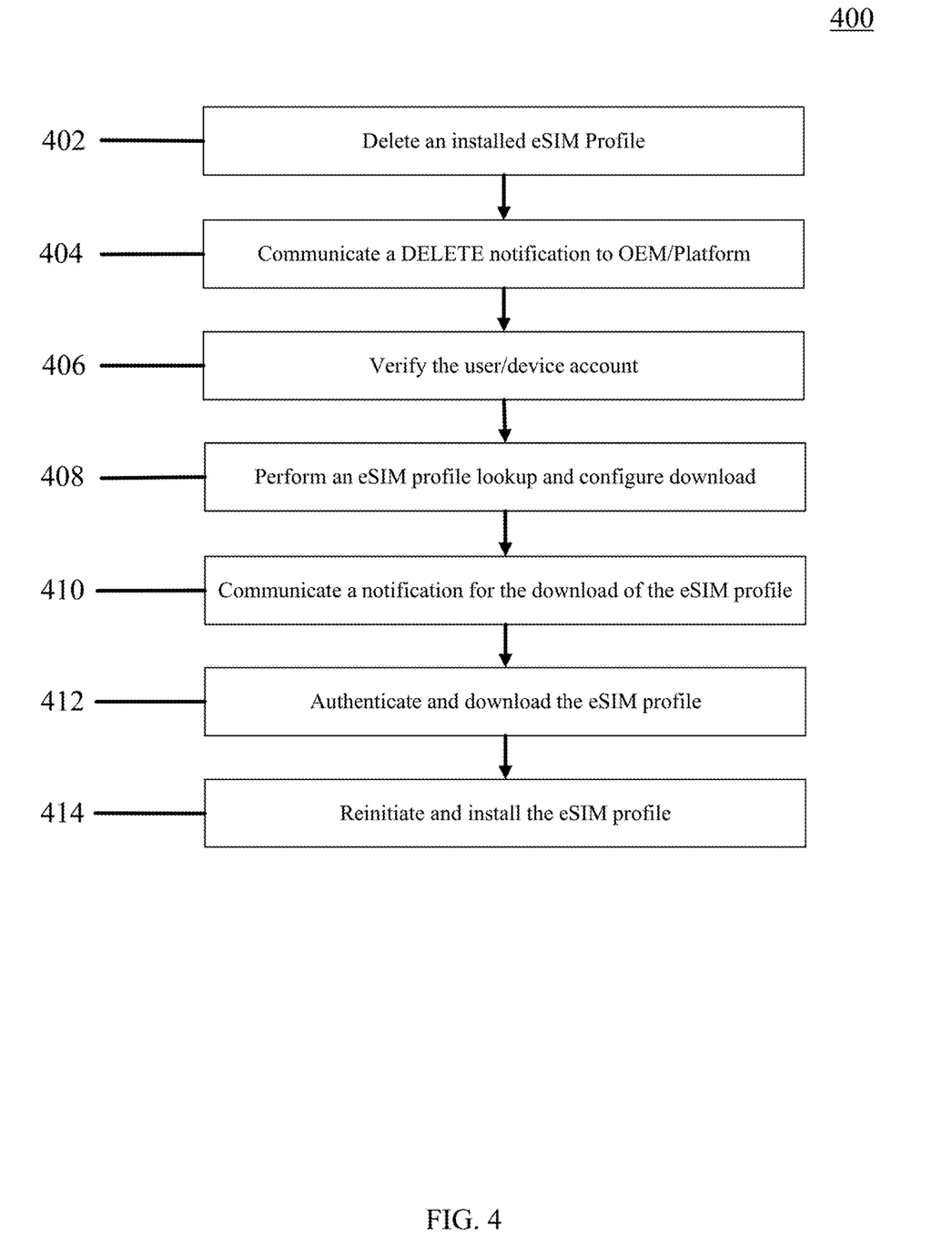
FIG. 4 illustrates an exemplary workflow according to some embodiments of the present disclosure.

In some embodiments, Step 306 can involve storing the eSIM profile (e.g., a version of, or replica based therefrom) in network storage (e.g., SM-DP device 108), should a reinitiation processing request be requested, as discussed below in relation to Process 400.

In Step 308, profiler 200 can generate an electronic notification message, which can be sent to the device of the user. The notification message can include information indicating that the download of the eSIM file is ready. In some embodiments, the notification can correspond to a push notification that causes execution of Step 310. In some embodiments, input may be required via the device (e.g., by the user or a service provider administrator, for example) to effectuate and/or approve the installation of the eSIM profile.

In Step 310, profiler 200 can authenticate the generated eSIM profile, which then causes the eSIM profile to be communicated to the user device and downloaded thereon. In some embodiments, Step 310 can involve the eSIM profile (e.g., provisioned account) being authenticated and verified, which can be based on account information of the user and/or device, as well as the carrier plan and specific cellular and data usage criteria/settings associated with such plan(s). For example, such authentication can correspond to determining that an active and good-standing account currently exists according to a subscription plan provided by a network provider (e.g., Verizon®). In some embodiments, the provisioned account and associated account information can be communicated via the SM-SR device 106 for secure routing to the SM-DP device 108, whereby such authentication and verification can be performed. In some embodiments, the SM-DP device 108 enables the user device (e.g., UE 102) to download and store the eSIM profile (e.g., enable the assignment of the provisioned account).

In Step 312, upon authentication and download of the eSIM profile in Step 310, the eSIM profile can be initiated and installed in the device. According to some embodiments, Step 312 enables the activation of the device according to the specific cellular plan, which enables cellular and/or data communications/activities to be performed via the device (e.g., make phone calls and access data networks, for example). In some embodiments, the initialization can involve customization, selection and/or application of carrier settings which enables the device to connect to the network (e.g., network 110) via the line of service assigned to the eSIM profile.

As such, according to some embodiments, the discussion above related to Process 300 correspond to the installation of an initial eSIM profile (e.g., a new account for the device).

Accordingly, as described in herein in relation to FIG. 4, Process 400 provides novel capabilities for the reinstatement of a deleted profile (e.g., via a MDM wipe, for example).

According to some embodiments Steps 402-404 of Process 400 can be performed by event module 206 of eSIM profiler 200; Step 406 can be performed by validation module 208; and Steps 408-414 can be performed by initiation module 204.

According to some embodiments, Process 400 can begin with Step 402 where an eSIM profile installed on a user device (e.g., UE 102) is deleted. According to some embodiments, as discussed above, the deletion can be a product of a factory reset of the user device or an MDM wipe, for example. In some embodiments, the deletion of Step 402 can involve a notification being sent to MNO access network 104 indicating that the eSIM profile has been removed. Accordingly, the deletion of the eSIM can result in the service plan of the device being deactivated, however, the device can still connect to (and/or maintain connection with) the network 110. As such, in order for the device to reestablish network connectivity associated with the service plan (e.g., perform cellular activities, for example), the eSIM profile must be reinstated, which can be enabled via the MNO via profiler 200, as discussed herein.

According to some embodiments, upon the deletion of the eSIM occurring, profiler 200 can receive a request for the reinstallation of the eSIM (e.g., a request to reconnect a user device to the network). In some embodiments, such request can be input by a user of the user device, and/or in some embodiments, the request can be automatically generated by the carrier via detection that an active account exists for the device. In some embodiments, the reinstallation of the eSIM profile can be in relation to the same user device where the deletion occurred, and in some embodiments, the reinstallation can be for a different device (e.g., a user upgrades their phone, for example). As such, upon such request being identified, Process 400 can proceed as follows.

In Step 404, upon detecting the delete event from Step 402, a DELETE notification can be communicated (from the MNO access network 104) to the carrier (e.g., SM-SR device 106, which manages connectivity for devices, and/or an OEM server associated with Verizon® services, for example). The notification can be generated upon profiler 200 detecting that the device is no longer active on the network (or detectable), which can be a byproduct of the connection being severed via the deletion of the eSIM profile (in Step 402).

In Step 406, upon detecting and/or receiving the DELETE notification, profiler 200 can verify the account associated with the user and/or user device (e.g., UE 102). According to some embodiments, such verification can involve determining whether an active (and in good standing, in some embodiments) account exists for the user/user device. In some embodiments, Step 406 can involve profiler 200 executing authentication steps in a similar manner as discussed above in relation to Step 310 of Process 300. Accordingly, Step 406 can involve profiler 200 authenticating the credentials of the user device based on existing account credentials stored within the SM-DP device 108 (e.g., if information related to the user device match plan credentials stored at the SM-DP device 108, then the account for the user device can be verified).

In Step 408, profiler 200, upon verifying the account for the user device as in Step 406, can perform an eSIM profile look up and configure a download of the eSIM profile file. In some embodiments, Step 408 can involve locating the user account and associated records of the MDN stored on the SM-DP device 108. Upon identification of the associated information, profiler 200 can configure the corresponding eSIM profile for download. Such configuration can be performed in a similar manner as discussed above at least in relation to Step 306 of Process 300. In some embodiments, Step 408 can involve creating a "clone" (or replica) eSIM profile of the one that was deleted. In some embodiments, Step 408 can involve retrieving from a datastore on the network a copy or version of the previously provided eSIM profile.

In Step 410, profiler 200 can generate and communicate a notification for the download of the eSIM profile. Such communication can be performed in a similar manner as discussed above in relation to Step 308 of Process 300.

In Step 412, profiler 200 can enable the authentication and download of the eSIM profile. And in Step 414, the downloaded eSIM profile can be initiated (e.g., reinitiated) and installed on the user device. According to some embodiments, Steps 412-414 can be performed in a similar manner as discussed above in relation to Steps 310-312 of Process 300. Accordingly, Step 414 enables the re-activation for the line of service within network 110 for the user device.

In some embodiments, as discussed above, the eSIM profile may be deleted from a user device in situations where a user is upgrading their device (e.g., changing devices). As such, in some embodiments, the processing of the steps of Process 400 can enable the installation and initiation of the eSIM profile, via Step 414, on the new device. Accordingly, the new device may be authenticated and verified via similar steps discussed above in relation to Process 400.

Figure 5:
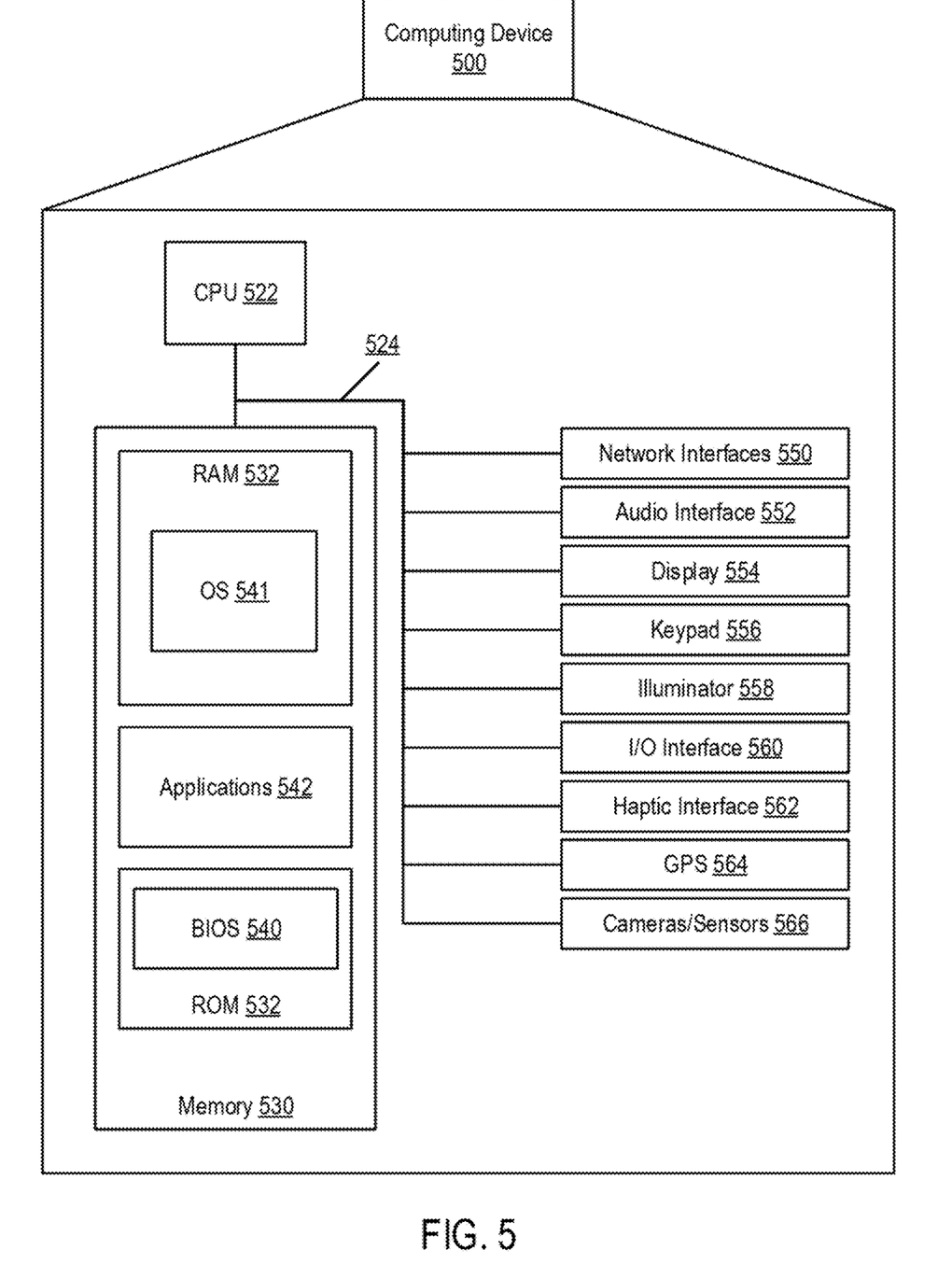
FIG. 5 is a block diagram illustrating a computing device showing an example of a client or server device used in various embodiments of the present disclosure.

FIG. 5 is a schematic diagram illustrating a client device showing an example embodiment of a client device that may be used within the present disclosure. Client device 500 may include many more or less components than those shown in FIG. 5. However, the components shown are sufficient to disclose an illustrative embodiment for implementing the present disclosure. Client device 500 can represent, for example, UE 102 as discussed above.

As shown in the figure, client device 500 includes a processing unit (CPU) 522 in communication with a mass memory 530 via a bus 524. Client device 500 also includes a power supply 526, one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal or electromagnetic sensors 566. Device 500 can include one camera/sensor 566, or a plurality of cameras/sensors 566, as understood by those of skill in the art. Power supply 526 provides power to client device 500.

Client device 500 may optionally communicate with a base station (not shown), or directly with another computing device. Network interface 550 is sometimes known as a transceiver, transceiving device, or network interface card (NIC).

Audio interface 552 can be arranged to produce and receive audio signals such as, for example, the sound of a human voice. Display 554 can, but is not limited to, include a touch sensitive screen arranged to receive input from an object such as a stylus or a digit from a human hand. Keypad 556 can comprise any input device arranged to receive input from a user. Illuminator 558 may provide a status indication and/or provide light.

Client device 500 also comprises input/output interface 560 for communicating with external devices. Input/output interface 560 can utilize one or more communication technologies, such as USB, infrared, Bluetooth™, or the like. Haptic interface 562 is arranged to provide tactile feedback to a user of the client device.

Optional GPS transceiver 564 can determine the physical coordinates of client device 500 on the surface of the Earth. In some embodiments however, client device 500 may through other components, provide other information that may be employed to determine a physical location of the device, including for example, a MAC address, Internet Protocol (IP) address, or the like.

Mass memory 530 includes a RAM 532, a ROM 534, and other storage means. Mass memory 530 stores a basic input/output system ("BIOS") 540 for controlling low-level operation of client device 500. The mass memory also stores an operating system 541 for controlling the operation of client device 500.

Memory 530 further includes one or more data stores, which can be utilized by client device 500 to store, among other things, applications 542 and/or other information or data. For example, data stores may be employed to store information that describes various capabilities of client device 500. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within client device 500.

Applications 542 may include computer executable instructions which, when executed by client device 500, transmit, receive, and/or otherwise process audio, video, images, and enable telecommunication with a server and/or another user of another client device. Applications 542 may further include a search client that is configured to send, to receive, and/or to otherwise process a search query and/or search result.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by a processor, information indicating that an embedded security information management (eSIM) profile has been deleted from a user device;
   verifying, by the processor, an account associated with the user device, wherein the verification determines that credentials associated with the user device correspond to network hosted account information for an existing network plan;
   identifying, by the processor, a version of the eSIM profile upon verification of the account, the version of the eSIM profile corresponding to the deleted eSIM profile; and communicating, by the processor over the network, in response to the deletion of the eSIM profile, the identified version of the eSIM profile to the user device, the communication causing automatic installation of the version of the eSIM profile on the user device.

2. The method of claim 1, further comprising:
configuring the version of the eSIM profile as a downloadable file, wherein the communication comprises sending the downloadable file to the user device.

3. The method of claim 1, wherein the installation of the version of the eSIM profile comprises reestablishing connectivity of the service plan associated with the user device to the network.

4. The method of claim 1, further comprising:
receiving a request to create a new account for the user device;
generating a line of service for the user device;
generating the eSIM profile based on the line of service;
enabling an initial installation of the eSIM profile, such that network connectivity of the user device via the service plan is initially established via the installation.

5. The method of claim 4, wherein the received information corresponds to the deletion of the installed eSIM profile.

6. The method of claim 1, wherein the version of the eSIM profile is a stored copy of the deleted eSIM profile.

7. The method of claim 1, further comprising:
generating, based on the account information, a new eSIM profile, the new eSIM profile being a clone of the deleted eSIM profile, wherein the identified version of the eSIM profile is the new eSIM profile.

8. The method of claim 1, further comprising:
receiving a request to reestablish connectivity of the service plan associated with the user device with the network; and
generating and communicating, over the network, a delete notification based on the request, wherein the verification of the device is based on the delete notification.

9. The method of claim 1, wherein the eSIM profile corresponds to the service plan for the user device, the service plan corresponding to a network account that is provided via a network service provider and enables network connectivity and activity with the network, wherein the network is provided by the service provider.

10. The method of claim 1, wherein the user device is a mobile device.

11. The method of claim 1, further comprising:
identifying another user device; and
causing the automatic installation of the version of the eSIM profile on the other user device, wherein the other user device and the user device have the same user.

12. A non-transitory computer-readable storage medium tangibly encoded with computer-executable instructions, that when executed by a processor, performs a method comprising:
receiving, by the processor, information indicating that an embedded security information management (eSIM) profile has been deleted from a user device;
verifying, by the processor, an account associated with the user device, wherein the verification determines that credentials associated with the user device correspond to network hosted account information for an existing network plan;
identifying, by the processor, a version of the eSIM profile upon verification of the account, the version of the eSIM profile corresponding to the deleted eSIM profile; and
communicating, by the processor over the network, in response to the deletion of the eSIM profile, the identified version of the eSIM profile to the user device, the communication causing automatic installation of the version of the eSIM profile on the user device.

13. The non-transitory computer-readable storage medium of claim 12, further comprising:
configuring the version of the eSIM profile as a downloadable file, wherein the communication comprises sending the downloadable file to the user device.

14. The non-transitory computer-readable storage medium of claim 12, wherein the installation of the version of the eSIM profile comprises reestablishing connectivity of the service plan associated with the user device to the network.

15. The non-transitory computer-readable storage medium of claim 12, further comprising:
receiving a request to create a new account for the user device;
generating a line of service for the user device;
generating the eSIM profile based on the line of service;
enabling an initial installation of the eSIM profile, such that network connectivity of the user device via the service plan is initially established via the installation, wherein the received information corresponds to the deletion of the installed eSIM profile.

16. The non-transitory computer-readable storage medium of claim 12, further comprising:
receiving a request to reestablish connectivity of the service plan associated with the user device with the network; and
generating and communicating, over the network, a delete notification based on the request, wherein the verification of the device is based on the delete notification.

17. A device comprising:
a processor configured to:
receive information indicating that an embedded security information management (eSIM) profile has been deleted from a user device;
verify an account associated with the user device, wherein the verification determines that credentials associated with the user device correspond to network hosted account information for an existing network plan;
identify a version of the eSIM profile upon verification of the account, the version of the eSIM profile corresponding to the deleted eSIM profile; and
communicate, over the network, in response to the deletion of the eSIM profile, the identified version of the eSIM profile to the user device, the communication causing automatic installation of the version of the eSIM profile on the user device.

18. The device of claim 17, wherein the processor is further configured to:
configure the version of the eSIM profile as a downloadable file, wherein the communication comprises sending the downloadable file to the user device.

19. The device of claim 17, wherein the installation of the version of the eSIM profile comprises reestablishing connectivity of the service plan associated with the user device to the network.

20. The device of claim 17, wherein the processor is further configured to:
receive a request to reestablish connectivity of the service plan associated with the user device with the network; and generate and communicate, over the network, a delete notification based on the request, wherein the verification of the device is based on the delete notification.

\* \* \* \* \*